US009746130B2

(12) United States Patent
Hung

(10) Patent No.: US 9,746,130 B2
(45) Date of Patent: Aug. 29, 2017

(54) SUPPORTING APPARATUS FOR SUSPENDING TWO DISPLAYS

(71) Applicant: Modernsolid Industrial Co., Ltd., Taichung (TW)

(72) Inventor: Chin-Jui Hung, Taichung (CN)

(73) Assignee: Modernsolid Industrial Co., Ltd., Taichung (TW)

( * ) Notice: Subject to any disclaimer, the term of this patent is extended or adjusted under 35 U.S.C. 154(b) by 64 days.

(21) Appl. No.: 15/143,729

(22) Filed: May 2, 2016

(65) Prior Publication Data

US 2016/0245458 A1 Aug. 25, 2016

Related U.S. Application Data

(63) Continuation of application No. 14/503,616, filed on Oct. 1, 2014, now Pat. No. 9,357,846.

(30) Foreign Application Priority Data

May 28, 2014 (TW) .............................. 103209373 U

(51) Int. Cl.
  *F16M 13/02* (2006.01)
  *A47B 97/00* (2006.01)
  (Continued)

(52) U.S. Cl.
  CPC ......... *F16M 13/022* (2013.01); *A47B 97/001* (2013.01); *F16M 11/045* (2013.01); *F16M 11/10* (2013.01); *F16M 11/125* (2013.01); *F16M 11/2014* (2013.01); *F16M 11/2085* (2013.01); *F16M 11/2092* (2013.01); *F16M 11/22* (2013.01); *F16M 11/24* (2013.01); *F16M 11/38* (2013.01); *F16M 13/02* (2013.01); *G06F 1/1601* (2013.01); *G09F 7/18* (2013.01); *G09F 7/20* (2013.01); *G09F 7/22* (2013.01);
  (Continued)

(58) Field of Classification Search
  CPC ............... A47B 97/001; F16M 13/022; F16M 11/2092; F16M 11/2014; F16M 11/24; F16M 11/2085; G09F 7/20; G09F 7/18; G09F 15/0018
  USPC ......... 248/125.7, 278.1, 282.1, 284.1, 286.1, 248/288.31, 298.1
  See application file for complete search history.

(56) References Cited

U.S. PATENT DOCUMENTS 5,678,794 A * 10/1997 Kump .................... A47F 5/0869
                                                            211/59.1
5,938,157 A *  8/1999 Reiker .................... E04B 9/006
                                                            156/71
(Continued)

*Primary Examiner* — Paola Agudelo
(74) *Attorney, Agent, or Firm* — Husch Blackwell LLP

(57) ABSTRACT

A supporting apparatus for suspending two displays includes: a base seat unit including a fixing bracket and a pillar that is connected to the fixing bracket; two suspending arms, each having a first end portion that is movably connected to the pillar unit such that each of the suspending arms is movable along the pillar, and a second end portion that is opposite to the first end portion; two slide track units respectively connected to the second end portions of the suspending arms; and two display-supporting bracket units movably connected to the slide track units for mounting the displays. Through operation of the suspending arms, the sliding track units and the display-supporting bracket units, the displays can be moved to juxtapose and contact each other.

10 Claims, 15 Drawing Sheets

(51) Int. Cl.

| | |
|---|---|
| *G06F 1/16* | (2006.01) |
| *G09F 7/20* | (2006.01) |
| *G09F 7/22* | (2006.01) |
| *G09F 15/00* | (2006.01) |
| *G09F 7/18* | (2006.01) |
| *F16M 11/10* | (2006.01) |
| *F16M 11/20* | (2006.01) |
| *F16M 11/24* | (2006.01) |
| *F16M 11/04* | (2006.01) |
| *F16M 11/12* | (2006.01) |
| *F16M 11/22* | (2006.01) |
| *F16M 11/38* | (2006.01) |

(52) U.S. Cl.
CPC ...... *G09F 15/0018* (2013.01); *G09F 15/0037* (2013.01); *G09F 15/0087* (2013.01); *A47B 2097/005* (2013.01); *F16M 2200/044* (2013.01); *F16M 2200/063* (2013.01); *F16M 2200/068* (2013.01)

(56) References Cited

U.S. PATENT DOCUMENTS

| | | | | |
|---|---|---|---|---|
| 8,162,268 | B1* | 4/2012 | Huang | F16M 11/08 248/124.1 |
| 8,162,271 | B2* | 4/2012 | Li | F16M 11/04 248/162.1 |
| 8,448,906 | B2* | 5/2013 | Sapper | F16M 11/08 248/122.1 |
| 8,596,599 | B1* | 12/2013 | Carson | B60R 11/0235 211/26 |
| 8,651,444 | B2* | 2/2014 | Sapper | F16M 11/2021 248/218.4 |
| 2004/0031894 | A1* | 2/2004 | Smed | F16M 11/04 248/278.1 |
| 2005/0230585 | A1* | 10/2005 | Hung | F16M 11/04 248/278.1 |
| 2007/0080266 | A1* | 4/2007 | Oddsen | A47B 49/00 248/125.7 |
| 2011/0315843 | A1* | 12/2011 | Hung | F16M 11/041 248/279.1 |

\* cited by examiner ized description.

SUPPORTING APPARATUS FOR SUSPENDING TWO DISPLAYS

CROSS-REFERENCE TO RELATED APPLICATION

This application is a continuation application of co-pending U.S. patent application Ser. No. 14/503,616, filed on Oct. 1, 2014, which claims priority of Taiwanese Patent Application No. 103209373, filed on May 28, 2014, the entire disclosure of which is hereby incorporated by reference.

FIELD OF THE INVENTION

This invention relates to a supporting apparatus, more particularly to a supporting apparatus for suspending two displays.

BACKGROUND OF THE INVENTION

Referring to FIGS. 1 and 2, a conventional supporting apparatus 1 for suspending two displays 10 includes a base seat unit 11, two suspending arms 12 and two display-supporting bracket units 13. Each suspending arm 12 has a first end portion that is connected rotatably to the base seat unit 11, and a second end portion that is connected to the corresponding displays-supporting bracket unit 13. The displays-supporting bracket units 13 are configured for respectively mounting the displays 10.

However, the displays 10 can only be moved by rotating the suspending arms 12 or by moving the second end portions of the suspending arms 12. Therefore, the degree of freedom to move the displays 13 is relatively low. When it is desired to move the displays 10 to juxtapose and contact each other, the second end portions of the suspending arms 12 have to be moved forwardly such that the suspending arms 12 and the displays 10 cooperatively form a generally triangular space therebetween. That is to say, the vertical distance between the base seat unit 11 and the displays 10 is relatively large (see FIG. 2), thereby increasing the space occupied by the supporting apparatus 1.

SUMMARY OF THE INVENTION

Therefore, the object of the present invention is to provide a supporting apparatus for suspending two displays that can overcome the aforesaid drawbacks of the prior art.

According to this invention, a supporting apparatus for suspending two displays includes a base seat unit, two suspending arms, two slide track units and two display-supporting bracket units. The base seat unit includes a fixing bracket and a pillar that is connected to the fixing bracket, that extends from the fixing bracket and that has a central axis. Each of the suspending arms has a first end portion that is movably connected to the pillar of the base seat unit such that each of the suspending arms is movable along the central axis of the pillar, and a second end portion that is opposite to the first end portion. Each of the slide track units is connected to the second end portion of a respective one of the suspending arms. Each of the display-supporting bracket units is movably connected to a respective one of the slide track units for mounting a respective one of the displays. Through operation of the suspending arms, the sliding track units and the display-supporting bracket units, the displays can be moved to juxtapose and contact each other.

BRIEF DESCRIPTION OF THE DRAWINGS

Other features and advantages of the present invention will become apparent in the following detailed description of the preferred embodiment of this invention, with reference to the accompanying drawings, in which.

DETAILED DESCRIPTION OF THE PREFERRED EMBODIMENT

Figure 3:
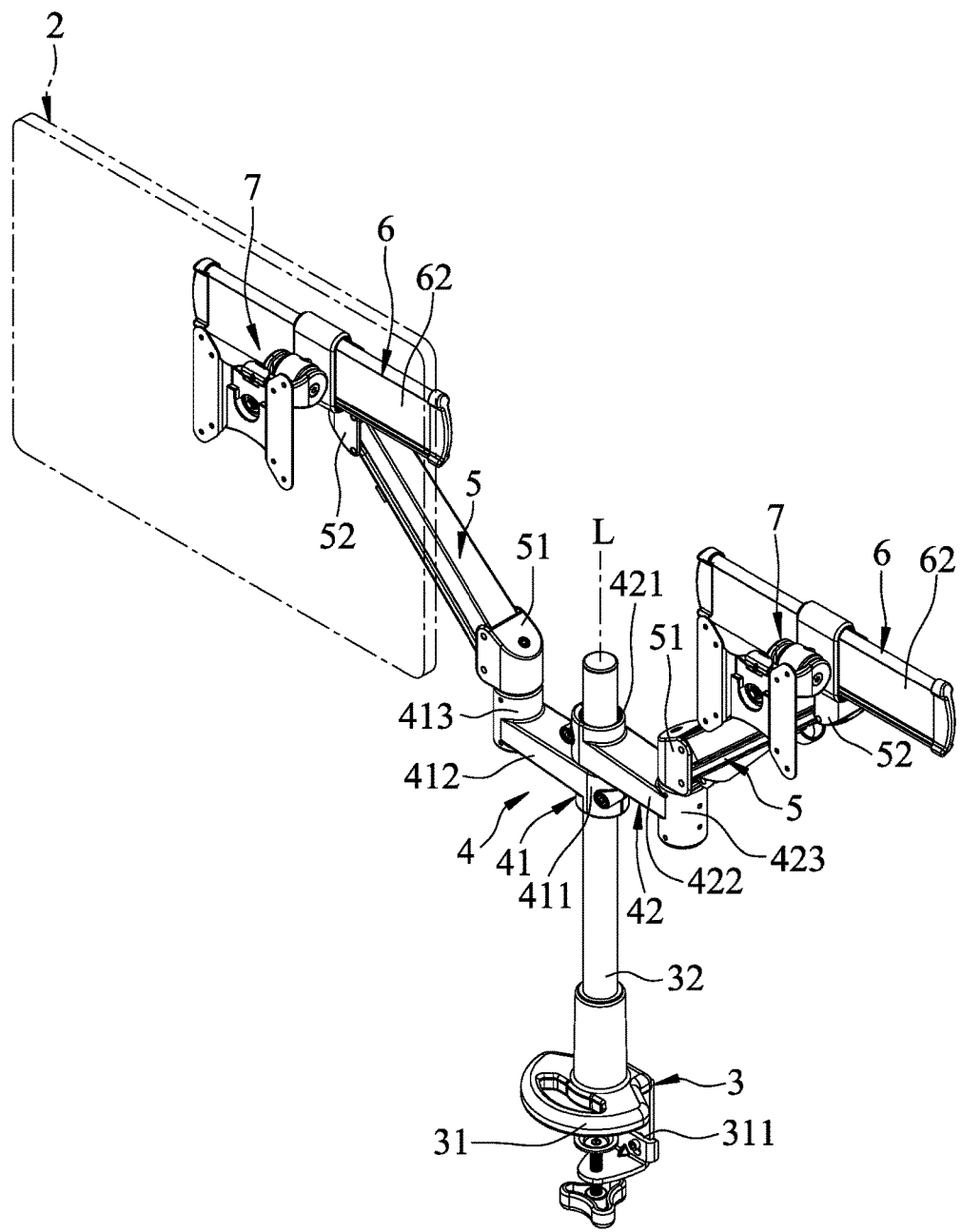
FIG. 3 is an assembled perspective view of the embodiment of a supporting apparatus for suspending two displays according to this invention.
Figure 4:
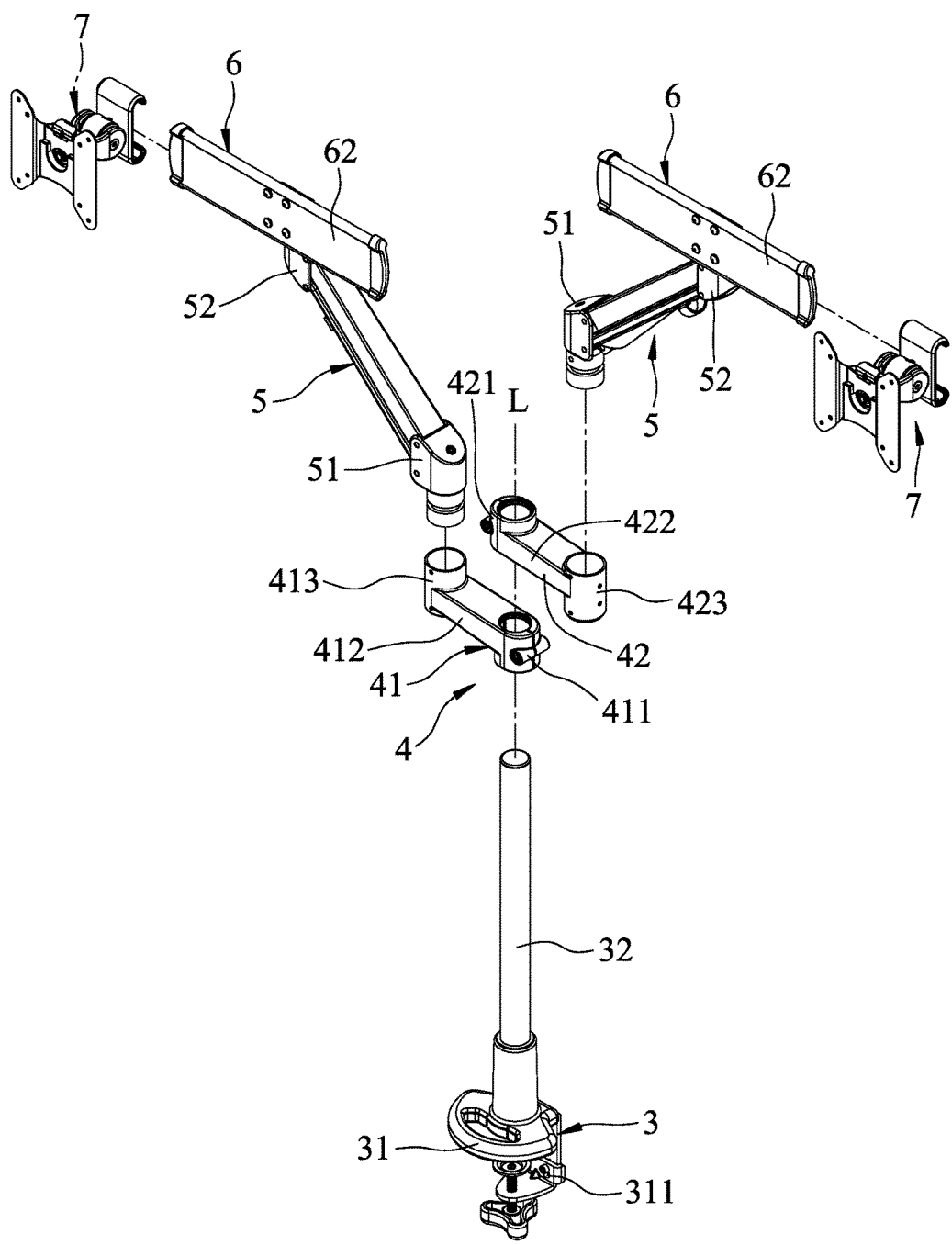
FIG. 4 is a partly exploded perspective view of the embodiment.

Referring to FIGS. 3 and 4, the embodiment of a supporting apparatus for suspending two displays 2 according to the present invention is shown to include a base seat unit 3, a connecting unit 4, two suspending arms 5, two slide track units 6 and two display-supporting bracket units 7.

The base seat unit 3 includes a fixing bracket 31 and a pillar 32 that is connected fixedly to the fixing bracket 31, that extends upwardly from the fixing bracket 31 and that has a central axis (L). The fixing bracket 31 has a C-shaped clamp 311 for mounting fixedly the base seat unit 3 on a desk or a table (not shown). In this embodiment, the pillar 32 is configured as a cylinder.

The connecting unit 4 includes a first connecting member 41 and a second connecting member 42. The first and second connecting members 41, 42 are respectively connected movably to the pillar 32 of the base seat unit 3 along the central axis (L). The first connecting member 41 is closer to the fixing bracket 31 than the second connecting member 42.

The first connecting member 41 has a first sleeving segment 411 and a first extending segment 412. The first sleeving segment 411 is sleeved and movable on the pillar 32 of the base seat unit 3 along the central axis (L) of the pillar 32 and is rotatable about the central axis (L). The first extending segment 412 is connected fixedly to the first sleeving segment 411, and extends from the first sleeving segment 411 in a direction away from the pillar 32 of the base seat unit 3. The first connecting member 41 further has a first projecting part 413 that is disposed at an end thereof distal from the pillar 32 of the base seat unit 3.

The second connecting member 42 has a second sleeving segment 421 and a second extending segment 422. The second sleeving segment 421 is sleeved and movable on the pillar 32 of the base seat unit 3 along the central axis (L) of the pillar 32 and is rotatable about the central axis (L). The second extending segment 422 is connected fixedly to the second sleeving segment 421, and extends from the second sleeving segment 421 in a direction away from the pillar 32 of the base seat unit 3. The second connecting member 42 further has a second projecting part 423 that is disposed at an end thereof distal from the pillar 32 of the base seat unit 3.

Figure 8:
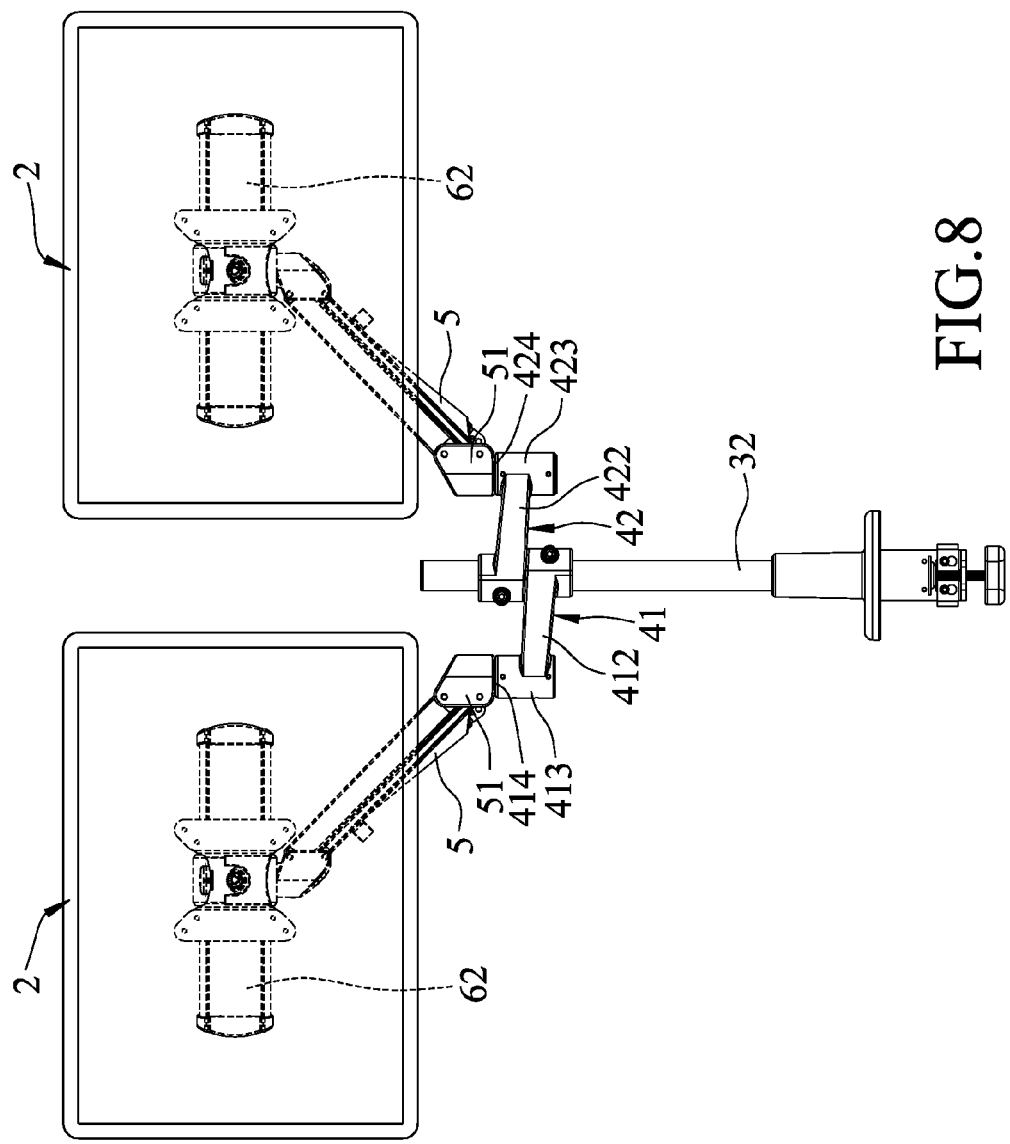
FIG. 8 is a front view of the embodiment and two displays suspended thereby.

When the first sleeving segment 411 of the first connecting member 41 is in contact with the second sleeving segment 421 of the second connecting member 42, a top end 414 of the first projecting part 413 is aligned with a top end 424 of the second projecting part 423 along a direction perpendicular to the pillar 32 (see FIG. 8).

It should be noted that the second projecting part 423 of the second connecting member 42 maybe omitted based on actual requirements. In this variation, when the first sleeving segment 411 of the first connecting member 41 is in contact with the second sleeving segment 421 of the second connecting member 42, the second extending segment 422 has a top end that is aligned with the top end 414 of the first projecting part 413 of the first connecting member 41.

Figure 5:
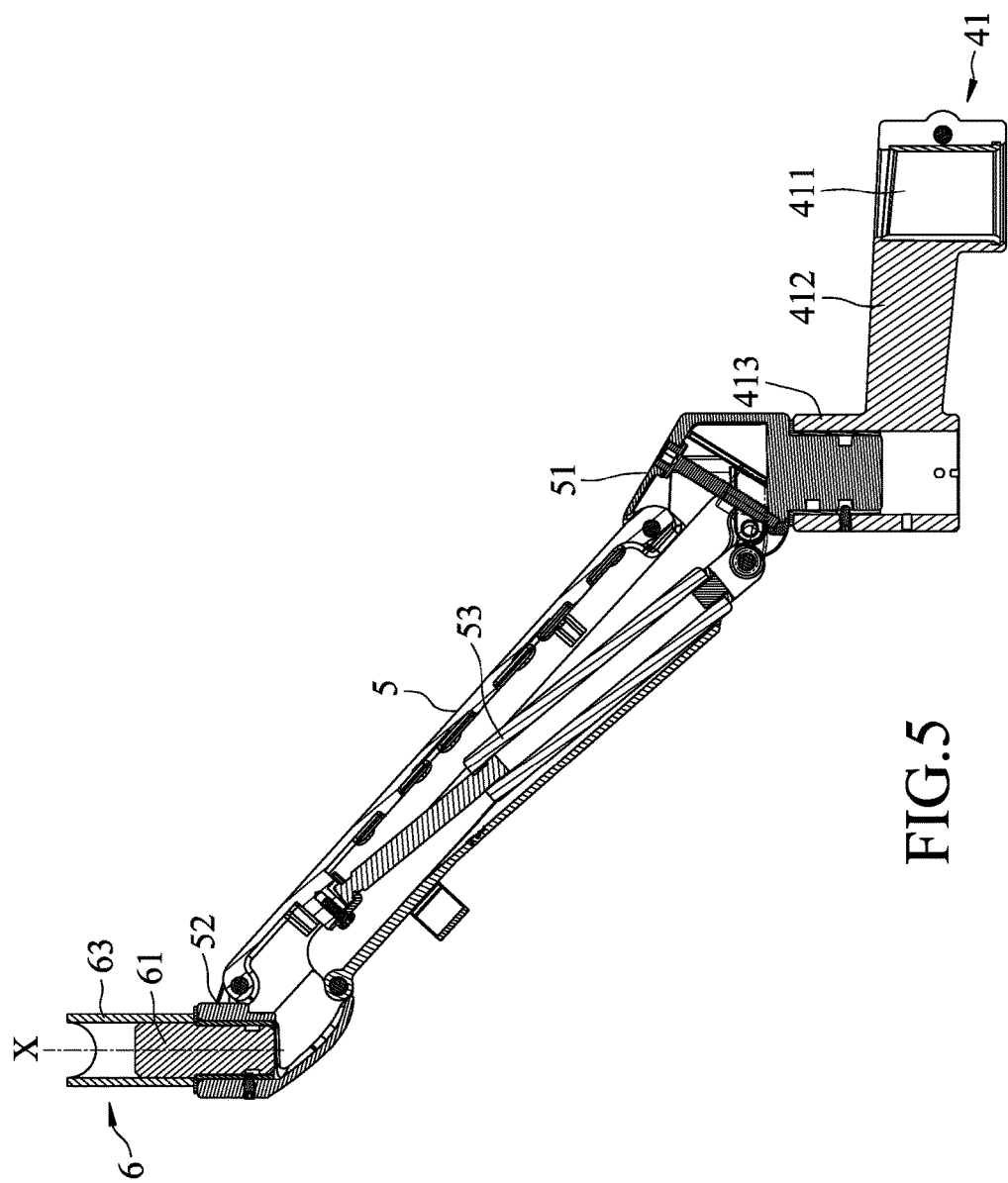
FIG. 5 is a sectional view, showing a suspending arm of the embodiment that interconnects a connecting unit and a slide track unit.
Figure 6:
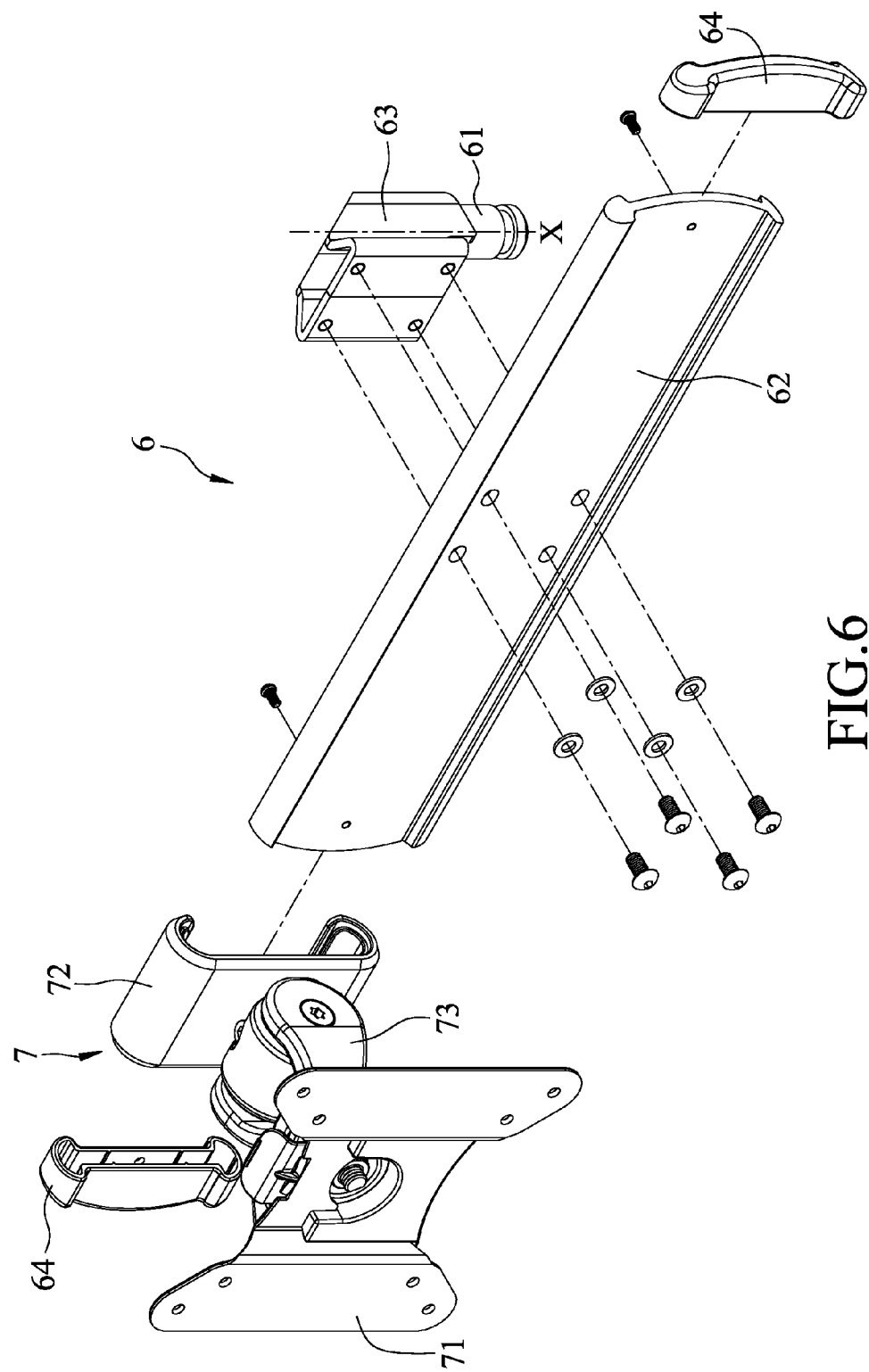
FIG. 6 is a partly exploded perspective view, showing the slide track unit and a display-supporting bracket unit of the embodiment.
Figure 7:
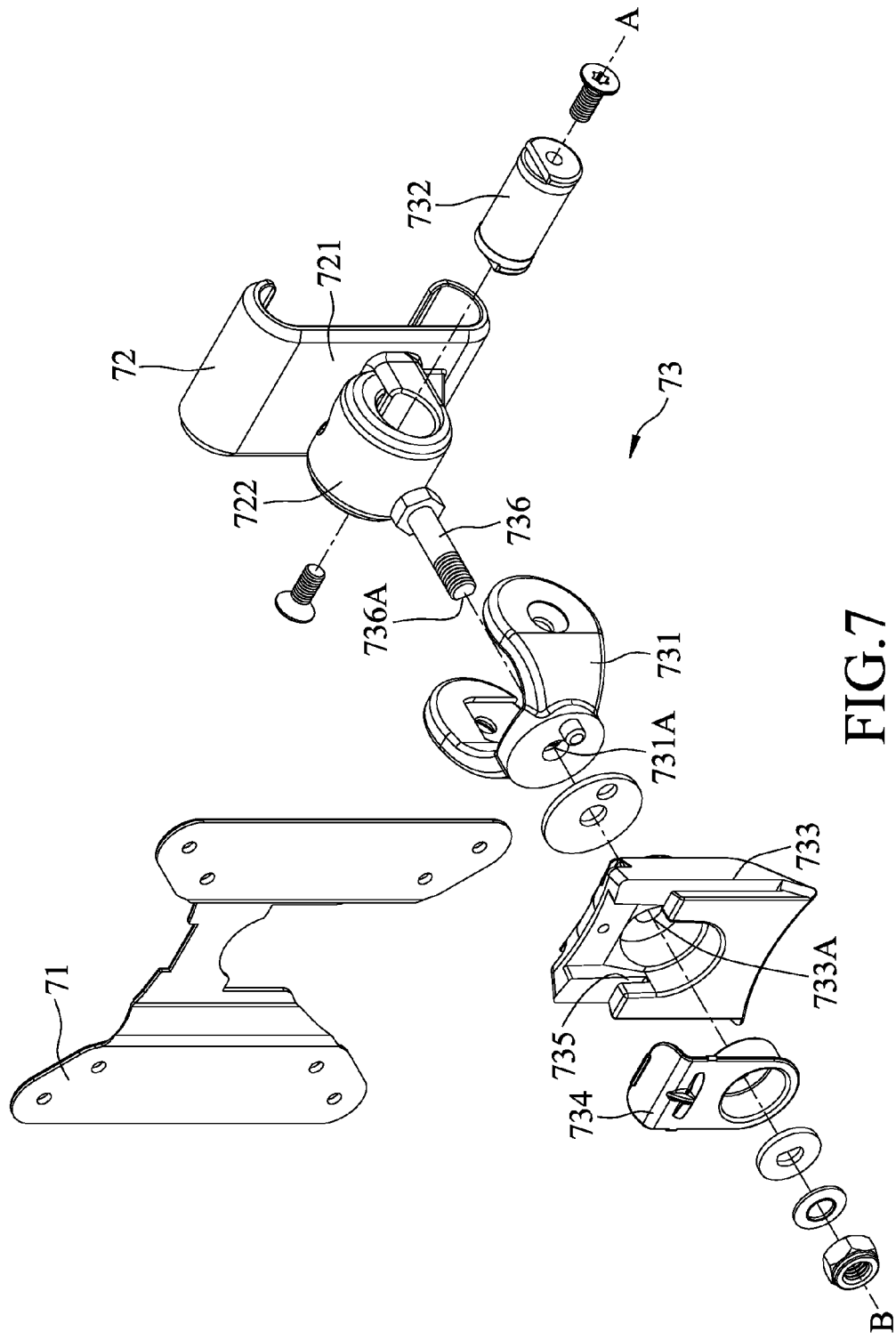
FIG. 7 is an exploded perspective view, showing the display-supporting bracket unit of the embodiment.

Referring to FIGS. 4 and 5, each of the suspending arms 5 has a first end portion 51, a second end portion 52 opposite to the first end portion 51, and a pressure cylinder 53.

The pressure cylinder 53 is connected between the first and second end portions 51,52 for reinforcing such that the second end portion 52 is movable relative to the first end portion 51.

In this embodiment, the first end portions 51 of the suspending arms 5 are respectively connected pivotally to the first and second projecting parts 413,423 of the first and second extending segments 412,422. To be more specific, the first connecting member 41 interconnects the first end portion 51 of one of the suspending arms 5 and the pillar 32 of the base seat unit 3 such that the first connecting member 41 is movable along the central axis (L) of the pillar 32; the second connecting member 42 interconnects the first end portion 51 of the other one of the suspending arms 5 and the pillar 32 of the base seat unit 3 such that the second connecting member 42 is movable along the central axis (L) of the pillar 32. That is to say, the first end portions 51 of the suspending arms 5 are movably connected to the pillar 32 of the base seat unit 3 through the first and second connecting members 41,42 such that the suspending arms 5 are respectively movable along the central axis (L) of the pillar 32.

However, it should be noted that, in the variation of this embodiment when the second projecting part 423 of the second connecting member 42 is omitted, one of the first end portions 51 of the suspending arms 5 is directly connected to the second extending segment 422.

Moreover, it should be further noted that in other variations of this embodiment, the connecting unit 4 may be omitted based on actual requirements. In this variation, the first end portions 51 of the suspending arms 5 are movably connected to the pillar 32 of the base seat unit 3 such that the suspending arms 5 are respectively movable along the central axis (L) of the pillar 32. For example, the first end portions 51 of the suspending arms 5 may be sleeved on the pillar 32 of the base seat unit 3. It is worth noting that the connection between the first end portions 51 of the suspending arms 5 and the pillar 32 of the base seat unit 3 is not limited to the above and may vary to meet actual requirements.

Referring to FIGS. 3 to 6, the slide track units 6 are respectively connected to the second end portions 52 of the suspending arms 5. Each of the slide track units 6 includes a connecting shaft 61, a slide track 62, a back cover 63 that interconnects the connecting shaft 61 and the slide track 62, and two end caps 64 respectively disposed at opposite ends of the slide track 62.

The connecting shaft 61 has a rotating axis (X) and is connected rotatably to the second end portion 52 of the corresponding suspending arm 5. The slide track 62 is fixedly connected to the connecting shaft 61, extends in a direction perpendicular to the rotating axis (X) of the connecting shaft 61 (see FIGS. 3 and 4), and is rotatable about the rotating axis (X) of the connecting shaft 61 relative to the corresponding suspending arm 5. In this embodiment, the back cover 63 is sleeved on the connecting shaft 61 and is connected threadedly to the slide track 62.

Referring to FIGS. 3, 4, 6 and 7, the display-supporting bracket units 7 are respectively and movably connected to the slide track units 6 for respectively mounting the displays 2.

Each of the display-supporting bracket units 7 includes a supporting member 71 for mounting the respective one of the displays 2, a sliding member 72 that is engaged movably to the slide track 62 of a corresponding one of the slide track units 6, and a joint 73 that interconnects the supporting member 71 and the sliding member 72, such that the joint 73 is rotatable relative to the sliding member 72 about a first axis (A), and the supporting member 71 is rotatable relative to the joint 73 about a second axis (B) perpendicular to the first axis (A).

The sliding member 72 of each of the display-supporting bracket units 7 has a clamping plate 721 that movably engages the slide track 62, and an extending portion 722 that extends from the clamping plate 721 toward the supporting member 71.

The joint 73 has a pivoting member 731, a pivot pin 732, a rotating member 733, a securing member 734, and a pivot bolt 736.

The pivoting member 731 is connected pivotally to the extending portion 722 of the sliding member 72 and is rotatable about the first axis (A). To be specific, in this embodiment, the pivot pin 732 extends rotatably through the extending portion 722 of the sliding member 72, and the pivoting member 731 is locked to the pivot pin 732 using two screws such that the pivoting member 731 is rotatable about the first axis (A).

The rotating member 733 is connected rotatably to the pivoting member 731, is rotatable about the second axis (B), is connected to the supporting member 71, and has an engaging groove 735 allowing for insertion of the supporting member 71.

The pivot bolt 736 extends non-rotatably through the pivoting member 731 and rotatably through an assembly of the rotating member 733 and the supporting member 71 so as to allow for rotation of the supporting member 71 and the rotating member 733 relative to the pivoting member 731 about the second axis (B). In this embodiment, the pivot bolt 736 has a flat side surface 736A, is received fittingly within a hole 731A in the pivoting member 731 so as to prevent rotation of the pivoting member 731 relative to the pivot bolt 736, and extends through a circular hole 733A in the rotating member 733 so as to allow for rotation of the rotating member 733 relative to the pivot bolt 736.

The securing member 734 is sleeved rotatably on the pivot bolt 736 for fixing the supporting member 71 in the engaging groove 735 by confining the supporting member 71 between the securing member 734 and the rotating member 733.

The supporting member 71 is rotatable relative to the sliding member 72 about the first and second axes (A,B). To be specific, the supporting member 71 is co-rotatable with the pivoting member 731 relative to the sliding member 72 about the first axis (A), and is co-rotatable with the rotating member 733 relative to the sliding member 72 about the second axis (B.

Through operation of the suspending arms 5, the sliding track units 6 and the display-supporting bracket units 7, the displays 2 can be moved to juxtapose and contact each other. FIGS. 8 to 15 show that, through operation of the suspending arms 5, the sliding track units 6 and the display-supporting bracket units 7, the displays 2 can be moved to various desired relative positions, e.g., located respectively at two opposite sides of the supporting apparatus and facing away from each other (see FIGS. 12 and 13), one being supported in a vertical position (i.e., long sides of the display are vertical) while the other one being supported in a horizontal position (i.e., long sides of the display are horizontal) (see FIG. 14), or each being supported in an inclined position (see FIG. 15).

Figure 9:
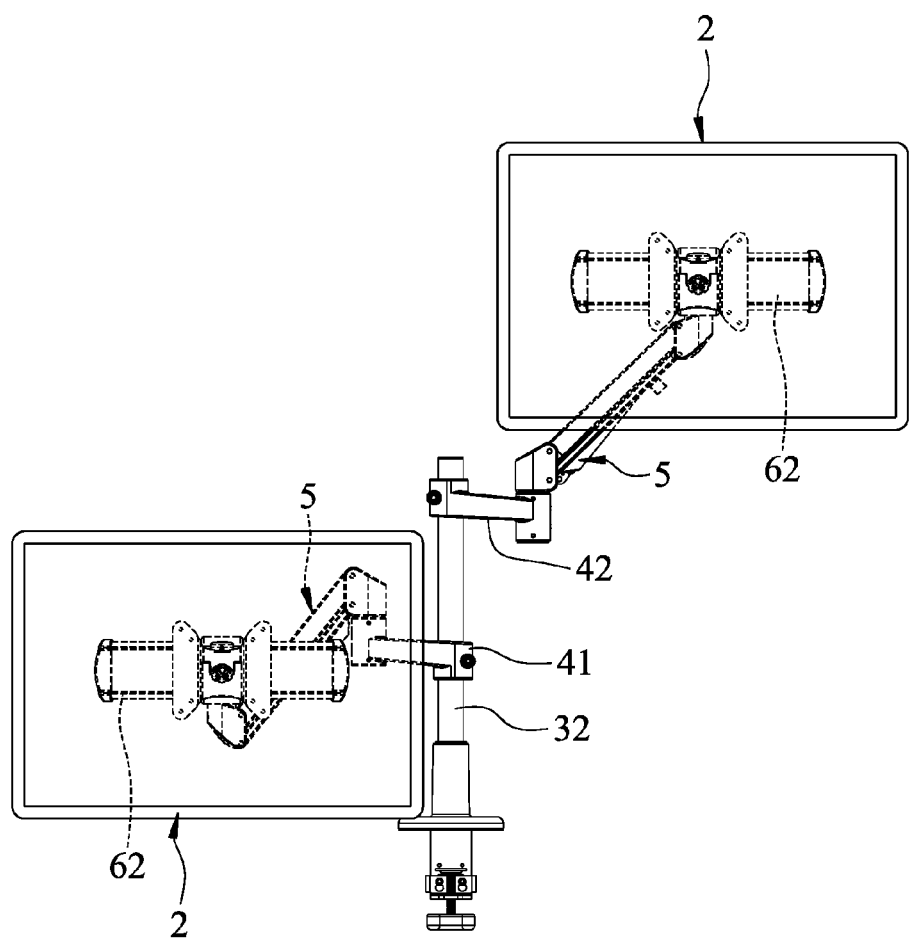
FIG. 9 is a front view of the embodiment and the two displays suspended thereby.

Referring to FIGS. 8 and 9, the displays 2 can be vertically moved by adjusting the positions of the first/second connecting members 41,42 relative to the pillar 32 of the base seat unit 3, and by adjusting the positions of the second end portions 52 relative to the first end portions 51 of the suspending arms 5.

Figure 1:
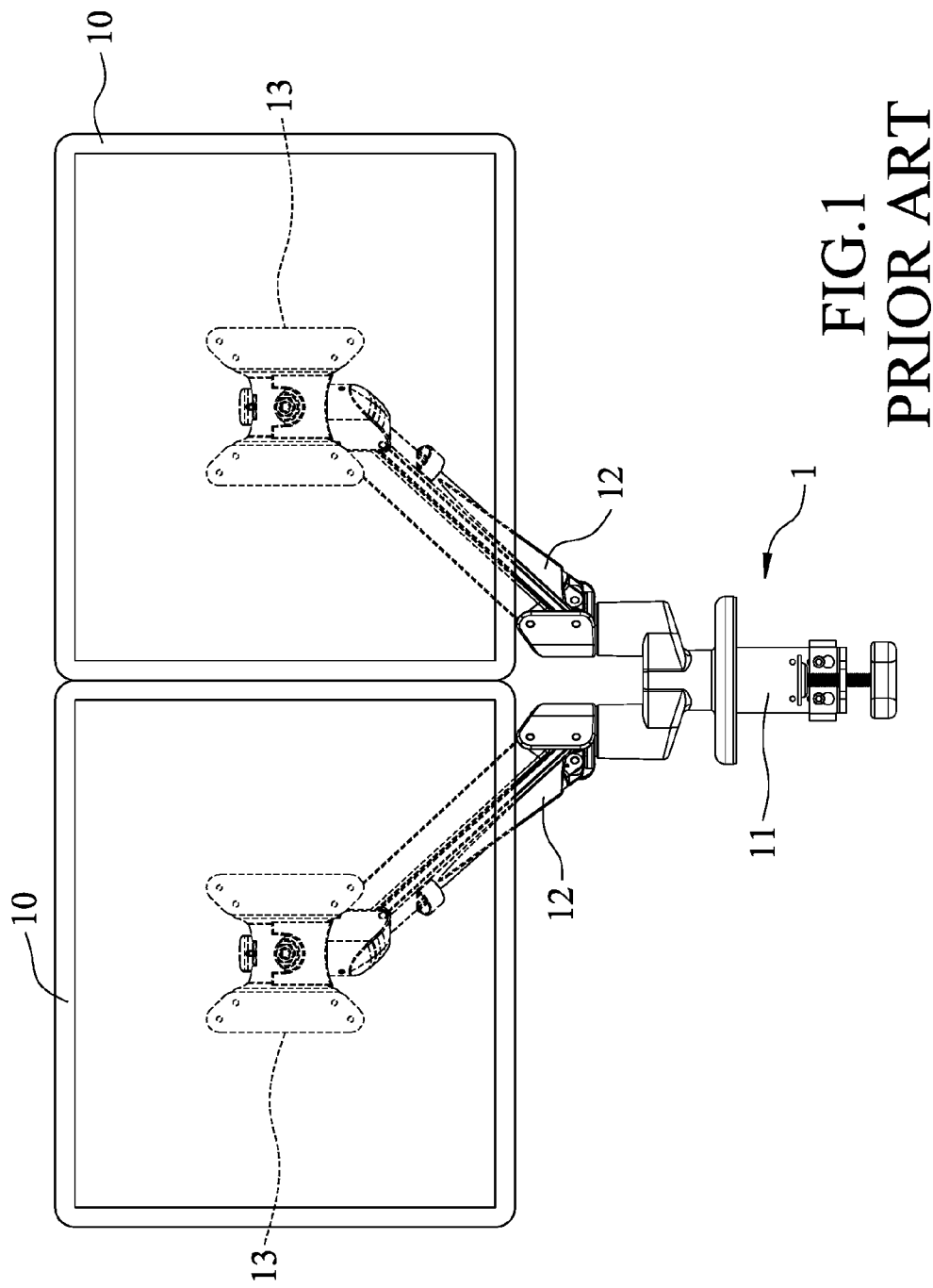
FIG. 1 is a front view of a conventional supporting apparatus and two displays suspended thereby.
Figure 2:
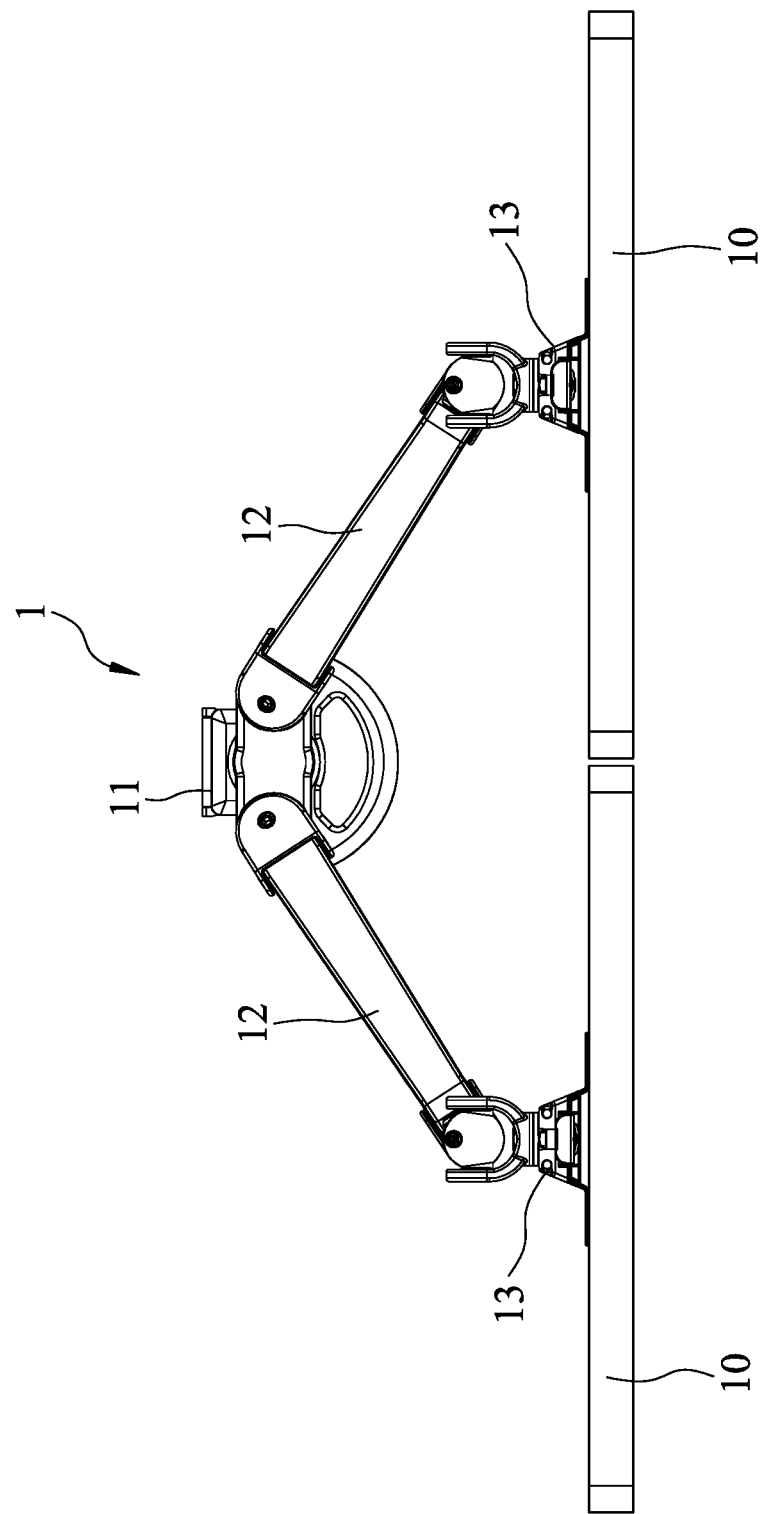
FIG. 2 is a top view of the supporting apparatus and the two displays shown in FIG. 1.
Figure 10:
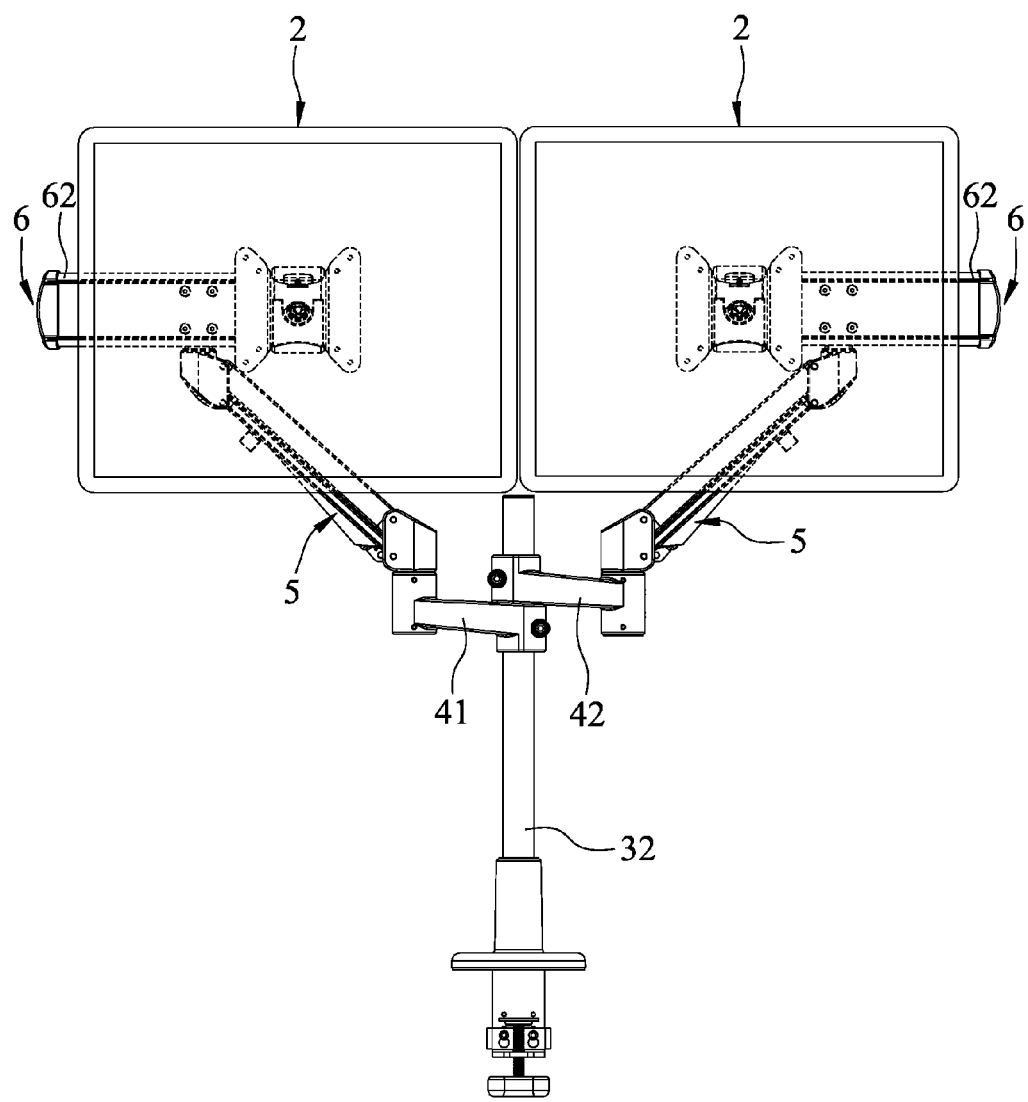
FIG. 10 is another front view of the embodiment and the two displays suspended thereby, illustrating that the two displays are moved to juxtapose and contact each other.
Figure 11:
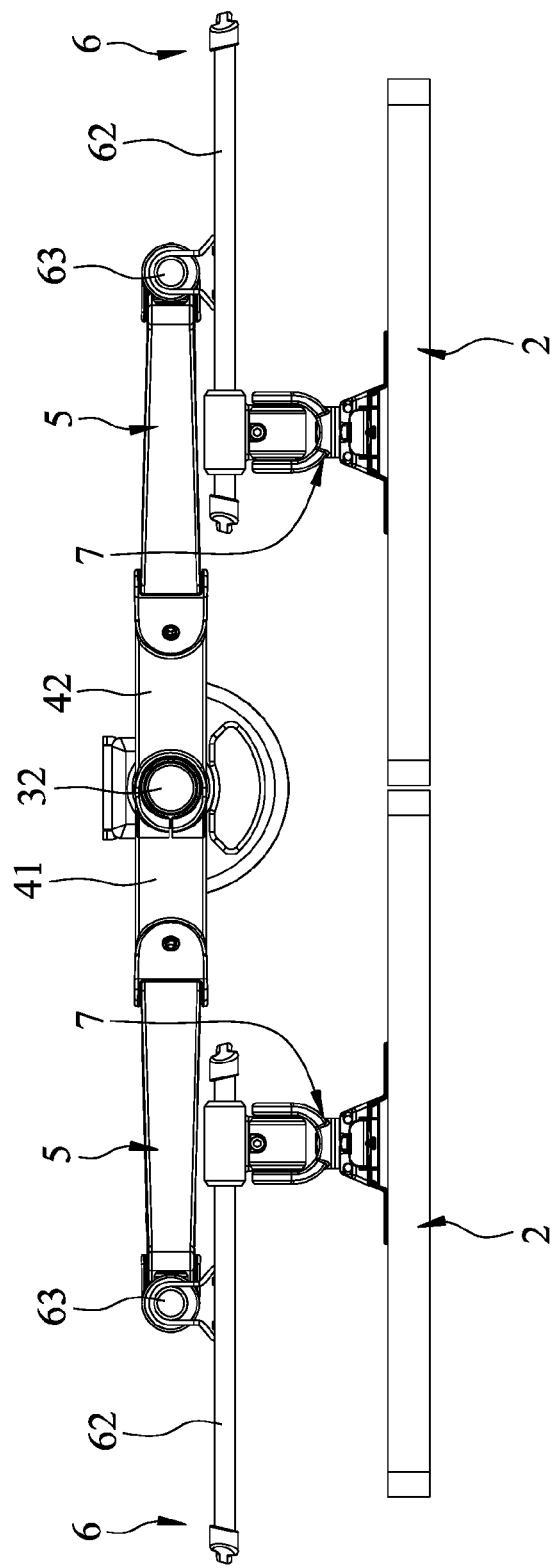
FIG. 11 is a top view of the embodiment of the supporting apparatus and the two displays shown in FIG. 10.

Referring to FIGS. 8, 10 and 11, the displays 2 can be horizontally moved by adjusting the connecting positions between the slide tracks 62 of the slide track units 6 and the sliding member 72 of the display-supporting bracket units 7. Therefore, the displays 2 can be easily moved to juxtapose and contact each other in a condition that the vertical distance between the displays 2 and the pillar 32 of the base seat unit 3 is relatively small compared to the prior art (see FIGS. 2 and 11).

Figure 12:
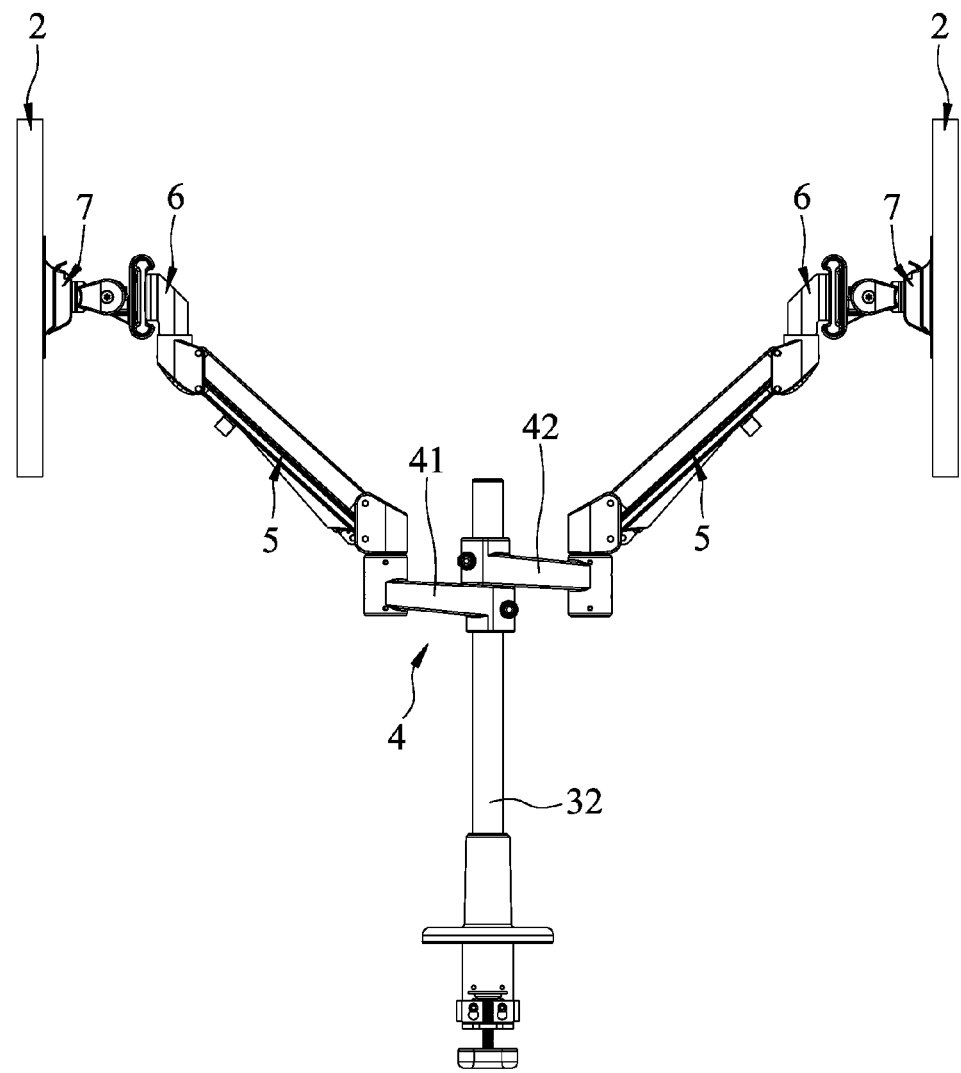
FIG. 12 is a front view of the embodiment and the two displays suspended thereby, illustrating that the two displays are moved to two sides of the supporting apparatus and face away from each other.
Figure 13:
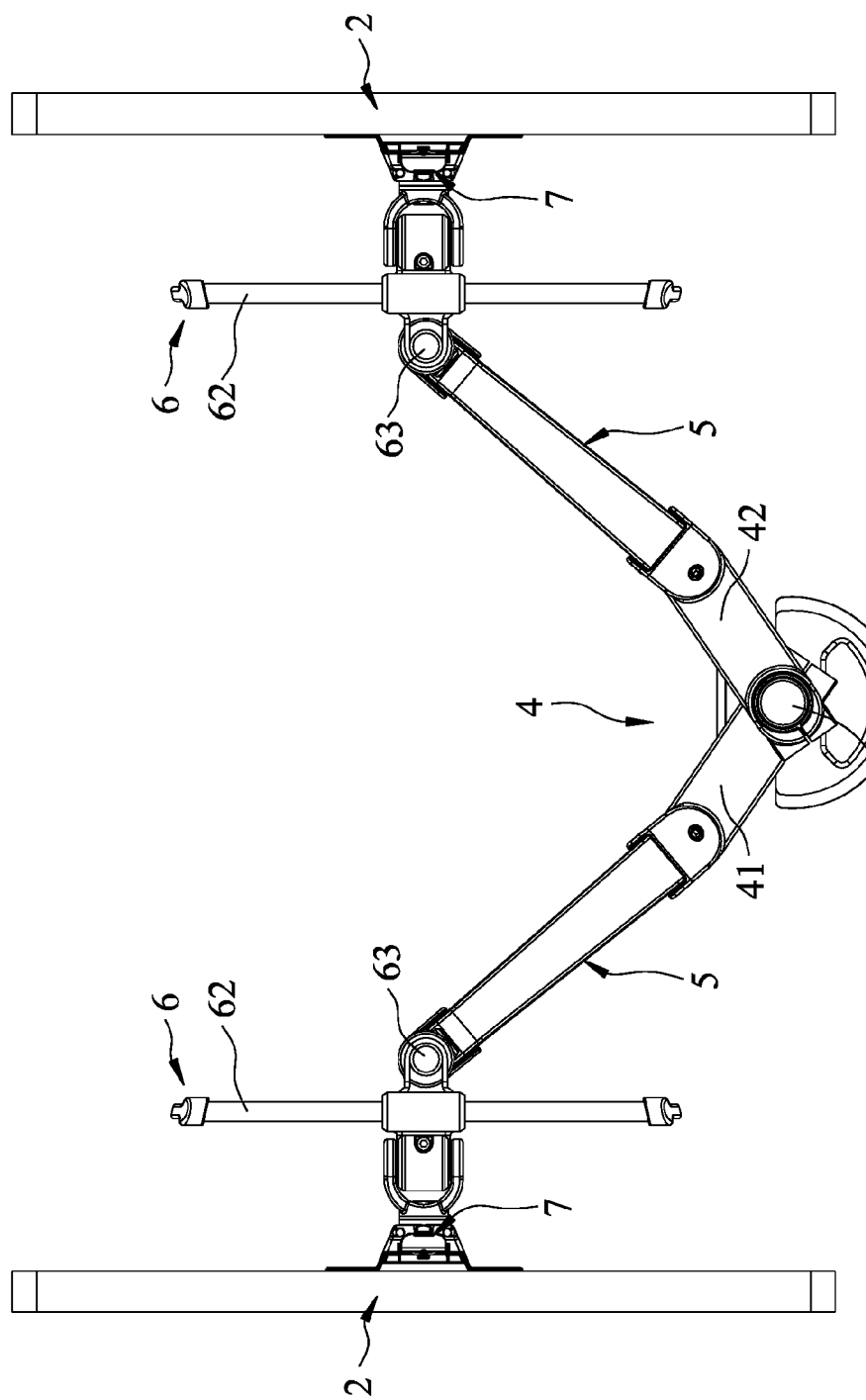
FIG. 13 is a top view of the embodiment and the two displays suspended thereby, illustrating that the two displays are moved to the two sides of the supporting apparatus and face away from each other.

Referring to FIGS. 12 and 13, the displays 2 can be rotated about the central axis (L) of the pillar 32 of the base seat unit 3 to be in multiple orientations by adjusting the connecting unit 4, the suspending arms 5 and the slide track units 6.

Figure 14:
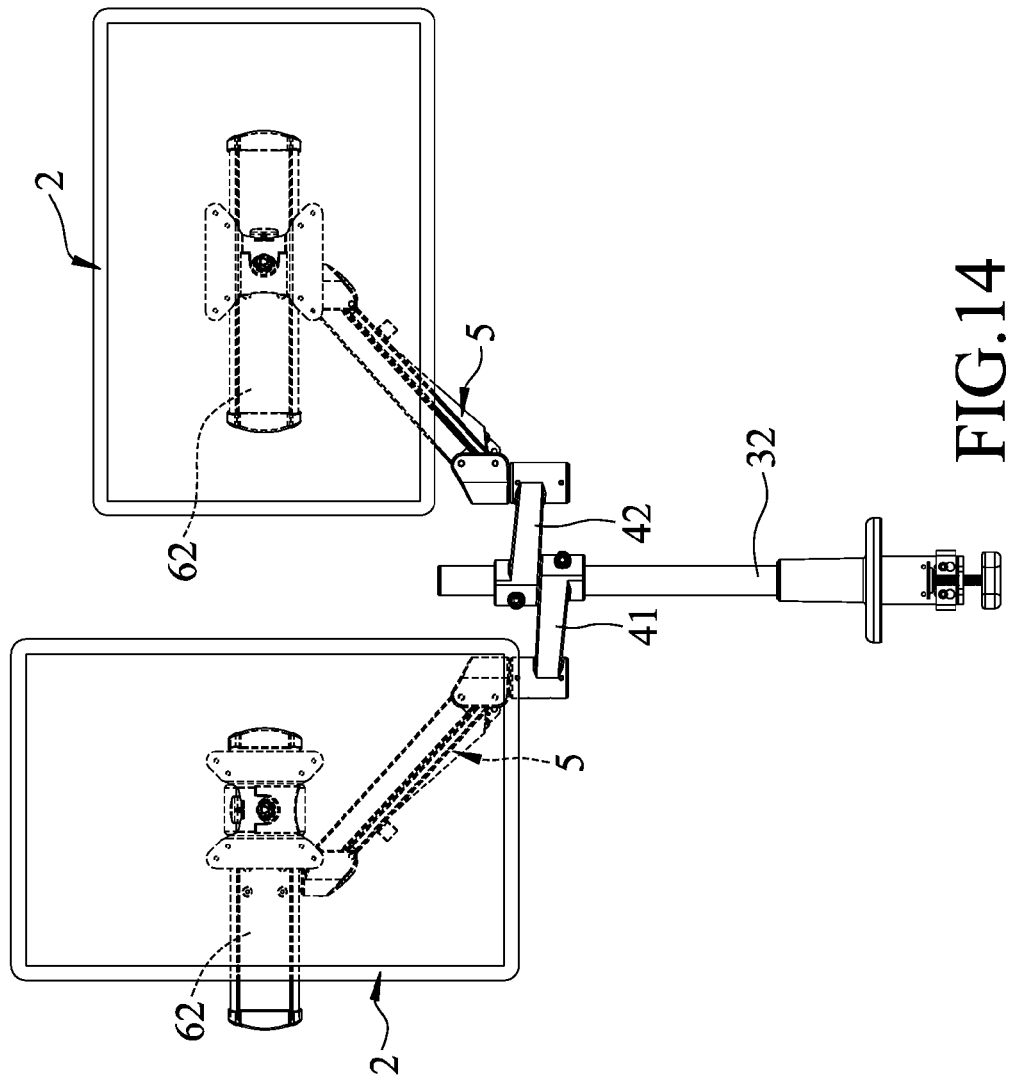
FIG. 14 is a front view of the embodiment and the two displays suspended thereby, illustrating that one of the two displays is supported in a vertical position, while the other one of the two displays is supported in a horizontal position.
Figure 15:
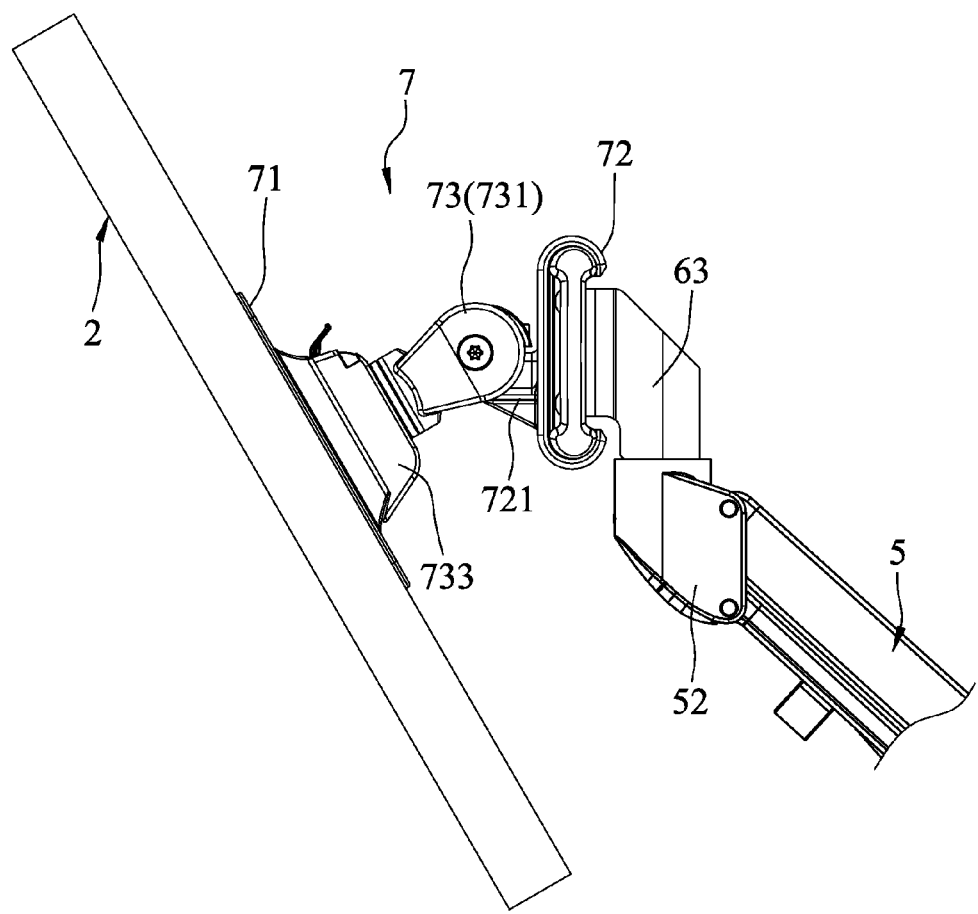
FIG. 15 is a fragmentary side view of the embodiment and a display suspended thereby, illustrating that the display is supported in an inclined position.

Referring to FIGS. 14 and 15, the displays 2 can be rotated about the first and second axes (A, B) by adjusting the joints 73 of the display-supporting bracket units 7. To be specific, referring to FIG. 14, by adjusting the rotating member 733 of the joint 73, each of the displays 2 is rotatable about the second axis (B) such that the displays 2 can be rotated to a vertical or horizontal position. Referring to FIG. 15, by adjusting the pivoting member 731 of the joint 73, each of the displays 2 is rotatable about the first axis (A) such that the displays 2 can be rotated to an inclined position.

Referring to FIGS. 10 and 14, it should be noted that the displays 2 can also be mounted on the supporting members 71 of the display-supporting bracket units 7 after the supporting members 71 rotate by 90 degrees (see FIG. 14). The connection between the supporting members 71 and the displays 2 are not limited to this embodiment and may vary based on actual requirements.

To sum up, through operation of the connecting unit 4, the suspending arms 5, the sliding track units 6 and the display-supporting bracket units 7, the degree of freedom to move the displays 13 is relatively high. When it is desired to move the displays 2 to juxtapose and contact each other, the displays 2 can be moved by only moving the display-supporting bracket units 7 on the slide tracks 62 of the slide track units 6. Therefore, the vertical distance between the displays 2 and the pillar 32 of the base seat unit 3 is relatively small, thereby significantly reducing the space occupied by the supporting apparatus.

While the present invention has been described in connection with what is considered the most practical embodiment, it is understood that this invention is not limited to the disclosed embodiment but is intended to cover various arrangements included within the spirit and scope of the broadest interpretation and equivalent arrangements.

What is claimed is:

1. A supporting apparatus for suspending two displays, comprising:
    a base seat unit including a fixing bracket and a pillar that is connected to said fixing bracket, that extends from said fixing bracket and that has a central axis;
    two suspending arms, each of said suspending arms having a first end portion that is movably connected to said pillar of said base seat unit such that each of said suspending arms is movable along the central axis of said pillar, a second end portion that is opposite to said first end portion, and an intermediate portion that is connected between said first and second end portions, said intermediate portion of each of said suspending arms being pivotable relative to said first end portion of said suspending arm about a pivotal axis that is substantially orthogonal to the central axis of said pillar;
    two slide track units, each of said slide track units being connected to said second end portion of a respective one of said suspending arms; and
    two display-supporting bracket units, each of said display-supporting bracket units being movably connected to a respective one of said slide track units and being adapted for mounting a respective one of the displays;
    wherein, through operation of said suspending arms, said sliding track units and said display-supporting bracket units, the displays can be moved to juxtapose and contact each other.

2. The supporting apparatus as claimed in claim 1, wherein each of said slide track units includes a connecting shaft that has a rotating axis and that is connected rotatably to said second end portion of a corresponding one of said suspending arms, and a slide track that is fixedly connected to said connecting shaft, that extends in a direction perpendicular to the rotating axis of said connecting shaft, and that is rotatable about the rotating axis of said connecting shaft relative to a corresponding one of said suspending arms.

3. The supporting apparatus as claimed in claim 2, wherein each of said display-supporting bracket units includes a supporting member for mounting the respective one of the displays, a sliding member that is engaged movably to said slide track of a corresponding one of said slide track units, and a joint that interconnects said supporting member and said sliding member, such that said joint is rotatable relative to said sliding member about a first axis, and said supporting member is rotatable relative to said joint about a second axis perpendicular to the first axis.

4. The supporting apparatus as claimed in claim 3, wherein:
said sliding member of each of said display-supporting bracket units has an extending portion that extends toward said supporting member;
said joint has a pivoting member that is connected pivotally to said extending portion of said sliding member and that is rotatable about the first axis, and a rotating member that is connected rotatably to said pivoting member, that is rotatable about the second axis, and that is connected to said supporting member; and
said supporting member is rotatable relative to said sliding member about the first and second axes.

5. The supporting apparatus as claimed in claim 4, wherein:
said joint further has a pivot bolt extending through said pivoting member and an assembly of said rotating member and said supporting member so as to allow for rotation of said supporting member and said rotating member relative to the pivoting member about the second axis;
said rotating member has an engaging groove allowing for insertion of said supporting member; and
said joint further has a securing member sleeved rotatably on said pivot bolt for fixing said supporting member in said engaging groove by confining said supporting member between said securing member and said rotating member.

6. The supporting apparatus as claimed in claim 1, further comprising a connecting unit that includes
a first connecting member that interconnects said first end portion of one of said suspending arms and said pillar of said base seat unit such that said first connecting member is movable along the central axis of said pillar, and
a second connecting member that interconnects said first end portion of the other one of said suspending arms and said pillar of said base seat unit such that said second connecting member is movable along the central axis of said pillar.

7. The supporting apparatus as claimed in claim 6, wherein:
said pillar is configured as a cylinder;
said first connecting member has a first sleeving segment that is sleeved movably on said pillar of said base seat unit and that is rotatable about the central axis of said pillar; and
said second connecting member has a second sleeving segment that is sleeved movably on said pillar of said base seat unit and that is rotatable about the central axis of said pillar.

8. The supporting apparatus as claimed in claim 7, wherein:
said first connecting member further has a first extending segment that is connected to said first sleeving segment and that extends from said first sleeving segment in a direction away from said pillar of said base seat unit;
said second connecting member further has a second extending segment that is connected to said second sleeving segment and that extends from said second sleeving segment in a direction away from said pillar of said base seat unit;
said first end portion of one of said suspending arms is connected pivotally to said first extending segment; and
said first end portion of the other one of said suspending arms is connected pivotally to said second extending segment.

9. The supporting apparatus as claimed in claim 8, wherein:
said first connecting member is closer to said fixing bracket than said second connecting member;
said first extending segment has a first projecting part that is disposed at an end thereof distal from said pillar of said base seat unit;
said second extending segment has a second projecting part that is disposed at an end thereof distal from said pillar of said base seat unit; and
when said first sleeving segment of said first connecting member is in contact with said second sleeving segment of said second connecting member, a top end of said first projecting part is aligned with that of said second projecting part along a direction perpendicular to said pillar.

10. The supporting apparatus as claimed in claim 6, wherein each of said suspending arms further has a pressure cylinder connected between said first and second end portions for reinforcing.

* * * * *